(12) United States Patent
Herweg et al.

(10) Patent No.: US 7,438,045 B2
(45) Date of Patent: Oct. 21, 2008

(54) METHOD OF OPERATING AN INTERNAL COMBUSTION ENGINE

(75) Inventors: Rüdiger Herweg, Esslingen (DE); Matthias Pfau, Ludwigsburg (DE); Jochen Schäflein, Stuttgart (DE); Mayk Stelter, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 11/651,433

(22) Filed: Jan. 9, 2007

(65) Prior Publication Data
US 2007/0144480 A1 Jun. 28, 2007

Related U.S. Application Data

(63) Continuation-in-part of application No. PCT/EP2005/007111, filed on Jul. 1, 2005.

(30) Foreign Application Priority Data
Jul. 16, 2004 (DE) .................... 10 2004 034 505

(51) Int. Cl.
*F02B 17/00* (2006.01)
(52) U.S. Cl. .................. 123/295; 123/299; 123/430
(58) Field of Classification Search .................. 123/295, 123/299, 430, 568.11, 568.14, 305
See application file for complete search history.

(56) References Cited

U.S. PATENT DOCUMENTS

| | | | |
|---|---|---|---|
| 6,336,436 B1 | 1/2002 | Miyakubo et al. | |
| 6,497,213 B2 * | 12/2002 | Yoshizawa et al. | 123/299 |
| 6,952,923 B2 * | 10/2005 | Branyon et al. | 60/597 |
| 2003/0192305 A1 | 10/2003 | Ikhoshi et al. | |
| 2004/0123849 A1 * | 7/2004 | Bryant | 123/563 |
| 2004/0177837 A1 * | 9/2004 | Bryant | 123/559.1 |

OTHER PUBLICATIONS

H. Xu et al. "An Investigation Into the Operating Mode Transitions of a Homogeneous Charge Compression Ignition Engine Using EGR Trapping", SAE Technical Paper Series. No. 2001-01-1911, Jun. 8, 2004, pp. 1-11.

* cited by examiner

*Primary Examiner*—John T Kwon
(74) *Attorney, Agent, or Firm*—Klaus J. Bach

(57) ABSTRACT

In a method of operating an internal combustion engine with a switch-over capability between a compression ignition mode of operation and a spark ignition mode of operation in higher load ranges which includes a cam-operated valve drive with a valve control providing, in the compression ignition mode of operation, for an increased valve overlap of the valve opening times, smooth engine operation and optimal exhaust gas emissions are obtained also during rapid load changes upon changing the engine operating mode as the change-over is accompanied by changes of the injection parameters, the throttling parameter and the valve control, which are coordinated with respect to one another as the valve control is switched over by changing the amplitude and phase position of the valve stroke of at least one of the inlet and outlet valves.

12 Claims, 4 Drawing Sheets

METHOD OF OPERATING AN INTERNAL COMBUSTION ENGINE

This is a Continuation-In-Part Application of International Application PCT/EP2005/007111 filed Jul. 1, 2005 and claiming the priority of German Application 10 2004 034 505.8 filed Jul. 16, 2004.

BACKGROUND OF THE INVENTION

The invention relates to a method of operating an internal combustion engine in a compression ignition mode during low and medium load operation and in a positive or spark ignition mode in higher load ranges.

In a reciprocating piston internal combustion engine in each cylinder a longitudinally movable piston delimits a combustion chamber in which a mixture of fuel and oxygen-containing fresh gas is burnt. For the admission of the fresh gas and the discharge of the exhaust gases, inlet and outlet channels are provided which include gas exchange valves which are controlled by a valve drive for performing a cyclic charge change.

In an operating mode with positive or spark ignition, the air/fuel mixture formed in the combustion chamber is ignited by the spark of a spark plug projecting into the respective cylinder. With spark ignition according to the Otto principle, a stoichiometric air/fuel mixture is formed by throttling of the fresh air flow in the air inlet channel to provide the required mixture volume. There is also another engine operating mode known which is called compression ignition or space ignition wherein, by a certain increase of the combustion chamber temperature by compression of the air/fuel mixture in the combustion chamber, the air/fuel mixture is ignited. In this operating mode, in which the fresh air is supplied to the cylinder unthrottled, the fuel is burnt with a higher degree of efficiency then during operation based on the Otto principle and, furthermore, fewer $NO_x$ emissions are generated. Operation with compression ignition, however, is to be limited to partial load operation of the internal combustion engine for various reasons. On one hand, the combustion noises, which increase with increasing engine load because of the combustion pressure increase, are not acceptable for motor vehicles. On the other hand, the $NO_x$ emissions increase during combustion of lean air/fuel mixtures during compression ignition under higher loads to such an extent that a complicated and expensive exhaust gas purification becomes necessary.

Furthermore, it must be taken into consideration that the combustion chamber temperature increase required for compression ignition is achieved by retaining exhaust gas in the combustion chamber and the admixing of exhaust gases under high loads results in so-called lambda limits. In order to comply with the requirement for motor vehicle engines to cover the whole load and speed range, under high engine loads, the engine is operated under high loads based on the Otto principle. Therefore, a change-over from operation in the spark ignition mode and operation in the compression ignition mode depending on the engine operating state is necessary.

DE 199 413 A1 discloses a method of operating a four-cycle reciprocating piston engine with a changeover between compression ignition and spark ignition during full load operation with stoichiometric mixture formation wherein the exhaust gas retention for improved auto or compression ignition is to be achieved by a controlled valve opening procedure and, at the same time, blocking of exhaust gas flow by an exhaust gas flap valve. The change-over between valve overlap and non-overlap operation, that is, the switch-over between the actuating times for the gas exchange valves for compression mode operation and respectively, spark-ignition operation is achieved by displacement of a camshaft whereby the phase position of the valve opening procedure is changed. For changeover of the operating mode the known method has to determine a multitude of operating parameters, that is, the exhaust gas retention, the throttling of the intake air as well as the ignition angle in the spark ignition operating mode and the amount and time of the fuel injection and, in addition, the exhaust gas recirculation rate. All control means for the parameters to be considered during a change-over from one to the other operating mode must be brought during engine operation into tune with the respective operating mode. Since not all these many control values are controllable during a change-over of the operating mode, in the known method the change-over from one to the other mode of operation occurs over several operating cycles, wherein first the camshaft is displaced and, subsequently, the closing or, respectively, opening of the throttle valve and of the exhaust gas backup valve occurs. During the change-over, the fuel injection is to be switched off.

In a similar way, U.S. Pat. No. 6,336,436 provides during a change-over from spark-ignition to compression ignition first for a change of the phase position of the gas exchange valves for increasing exhaust gas retention in the combustion chamber in order to achieve compression ignition wherein, during compression ignition operation, the closing time of the outlet valves is retarded with respect to spark ignition operation. At the same time, the opening time of the inlet valve is advanced in order to obtain the desired valve overlap. A change-over from one to the other mode of operation occurs over several operating cycles of the internal combustion engine. Herein, the injection times of a direct fuel injection are changed so that fuel is injected during the inlet stroke while the inlet valve is closed. The particular procedure for the transfer operation is considered to be necessary in order to facilitate a long change-over operation, and to counteract knocking of the internal combustion engine during switch-over of the operating mode.

DE 101 22 775 A1 discloses a hybrid engine with alternative compression ignition and spark ignition, wherein separate camshafts are provided for the inlet valves and the outlet valves together with a variable camshaft timing control for the switch over of the control times of the gas change valves. Herein, the timing control for the two camshafts is so designed that large changes and large valve overlap can be established. In this way, during the compression ignition mode of operation, the valve overlap can be large enough so that the inlet valve opens before the outlet valve closes. The control times are adjusted herein by changing the phase positions for the opening of the gas exchange valves.

In order to provide for the exhaust gas retention needed for the compression ignition by a relatively large valve overlap as well as provide for a small valve overlap during spark ignition operation so that, by the control of the gas exchange valves, two engine operating modes can be used over the whole load and speed range of the internal combustion engine, in the known methods, a fully usable valve drive is provided which is operated mechanically, electromechanically or electro-hydraulically. Such fully variable valve drives however are very expensive.

It is the object of the present invention to provide a method of operating an internal combustion engine with a change-over between a spark-ignition and a compression ignition mode of operation by which, with little construction expenditures, a change-over between the operating modes at high engine speeds and with optimal exhaust gas emission control is obtained also with load changes occuring during the operating mode change over.

SUMMARY OF THE INVENTION

In a method of operating an internal combustion engine with a switch-over capability between a compression ignition mode of operation and a spark ignition mode of operation in higher load ranges which includes a cam-operated valve drive with a valve control providing, in the compression ignition mode of operation, for an increased valve overlap of the valve opening times, smooth engine operation and optimal exhaust gas emissions are obtained also during rapid load changes upon changing the engine operating mode as the change-over is accompanied by changes of the injection parameters, the throttling parameter and the valve control, which are coordinated with respect to one another as the valve control is switched over by changing the amplitude and phase position of the valve stroke of at least one of the inlet and outlet valves.

It has been found that, with a change of the amplitude and the phase position, load-neutral switching-over as well as rapid load changes can be accommodated during an operating mode change without detrimentally affecting the operating smoothness of the internal combustion engine. The amplitude and phase position of the valve stroke can be changed with a fully variable valve drive, for example, a mechanical, electro-mechanical or electro-hydraulic camshaft valve drive. The method according to the invention, however, can be performed also with more simple valve drives, by which the amplitude and phase positions are adjustable and for establishing an optimal operating mode change-over the fuel injection parameters and the throttling are tuned to one another.

It is advantageous if the amplitude of the valve lift is changed by an exchange of two alternatively activatable cam contours of the valve drive, wherein, for each operating mode, another valve lift cam is used. For the switch-over of the alternatively usable cam contours advantageously a cup tappet can be used or, alternatively a cam follower may be provided. A partially variable cam valve drive for performing the method according to the invention with simple design features includes a phase adjuster disposed on the camshaft or camshafts for changing the phase position of the opening stroke. In this case, in internal combustion engines with two camshafts, the inlet valve phase positions can be adjusted for changing the valve overlap. With change of the operating mode, the injection parameters are changed in accordance with the desired operating load of the internal combustion engine. During a change-over to a compression ignition mode of operation, the injection duration of a main injection is reduced and, in a first operating cycle of the cylinder with compression ignition, the injection time is moved toward a later injection. The transient behavior of the spark ignition operating mode in which the intake air is throttled by a throttle valve does not detrimentally affects the switchover procedure and the rapid adjustability of the throttle valve flap in connection with the rapid response of the intake duct pressure make it possible to limit the switchover procedure to only a few cycles. Expediently, during switchover to the compression ignition operation, a pre-injection of fuel is suspended and is reinstated only after a few cycles of the switch-over operation. It has been found that the measures for adaptation of the injection amount and opening the throttle flap during switchover to compression ignition operation result in a stable operation in the first few operating cycles. Even if mechanical adjustment devices for switching-over the valve drive with comparatively low adjustment speeds are used which therefore provide initially only for relatively small adjustment speeds and therefore small exhaust gas back-up rates, the operating temperature required for compression ignition is still achieved as a result of the hot exhaust gases resulting from the previous engine operation in the spark ignition mode.

In the compression ignition operating mode, the combustion procedure reacts with high sensitivity to temperature changes of the intake air and is also influenced to a large degree by the temperature of the exhaust gases retained in the cylinder. The relatively hot exhaust gases of a preceding spark ignition operation can cause an excessively early or rapid combustion of the mixture in the compression ignition operating mode. This however can be counteracted by timing of the control procedures via the throttling member. In addition, it may be expedient after suspension of the pre-injection during an operating mode switch-over to reduce the pressure increase by retarding the fuel injection.

During a switchover from a high load spark ignition mode of operation to a low load compression ignition mode of operation, for reducing the maximum pressure gradient in the combustion chamber, first the load is reduced to the desired load level and then the operating mode changeover is executed.

During a change-over from the compression mode of operation to the spark ignition mode of operation, it is proposed to provide for the throttling of the fresh intake gas flow a few operating cycles before the switchover. By closing the throttle flap, the intake duct pressure is reduced already in the compression ignition mode of operation and the mixture is enriched. After the switch-over of the fuel injection parameters, the internal combustion engine can be operated for a few cycles in a spark ignition mode of operation with small inlet valve opening strokes and late opening of the inlet valves in order to ensure the necessary combustion stability during the transition. Advantageously, the throttling is initiated about five operating cycles ahead of a change of the fuel injection parameters. In the lean spark ignition operating mode with small valve opening strokes, the mixture is enriched to such an extent that a load-neutral switchover of the mode of operation with stable combustion is facilitated. Herein, the main fuel injection duration is adjusted in accordance with a constant load and the fuel supply is increased in accordance with the higher fuel requirements in the spark ignition engine operating mode.

During an operating mode switch-over from the compression ignition mode to the spark ignition mode of operation with increased load a rapid switch-over can be achieved with the measures according to the invention by initiating a throttling of the intake air flow and advancing the spark ignition already after only a few operating cycles. Since, during a change-over with a load increase, the intake air pressure is little changed in comparison with load-neutral switch-over, as adaptation measures during the switch-over only the throttling and the fuel injection volume must be adjusted. For a conversion to spark ignition operation, of course also the ignition timing needs to be adjusted.

Below the invention will be described in greater detail on the basis of the accompanying drawings.

DESCRIPTION OF A PARTICULAR EMBODIMENT

Figure 1:
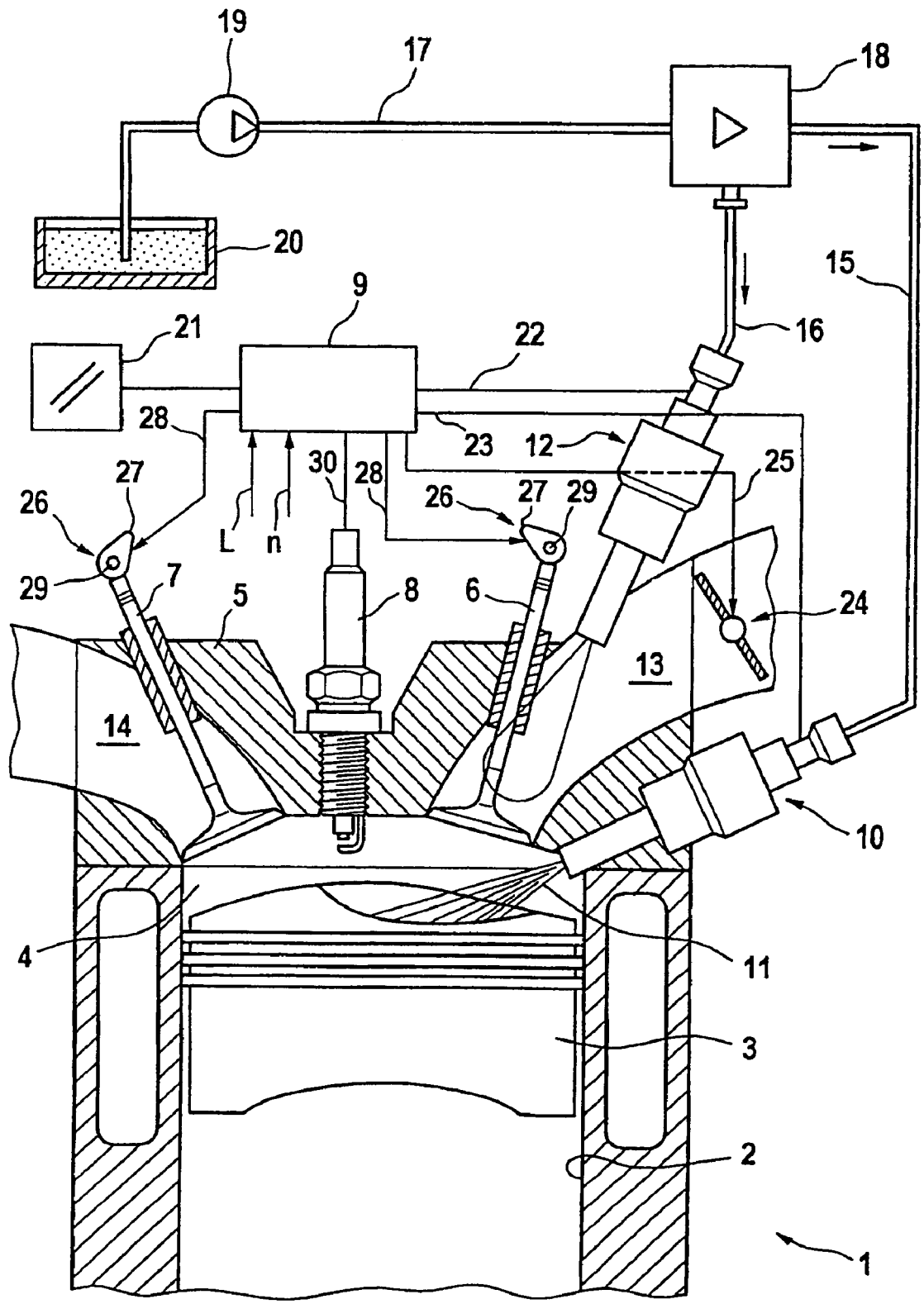
FIG. 1 shows schematically an internal combustion engine.

FIG. 1 shows a reciprocating piston internal combustion engine 1 including cylinders 2 in each of which a piston 3 is longitudinally movably disposed and delimits a combustion chamber 4, which is closed by a cylinder head 5 disposed on the cylinder 2. The cylinder head includes for each cylinder at least one inlet passage 13 and one outlet passage 14. Through the inlet passage 13, oxygen-containing fresh air is supplied to the cylinder for forming a combustible fuel/air mixture. After combustion of the fuel/air mixture, the combustion gases are discharged from the combustion chamber via the outlet passage 14. The cyclic charge change in the cylinder 2 is controlled by inlet and outlet valves 6 and 7, which are operated by a camshaft drive arrangement 26. The valve shafts of the inlet and outlet valves 6, 7 are operated by the cams 27 of the camshaft drive arrangement 26, which are operated by a camshaft 29. Expediently, a separate camshaft 29 is provided for the inlet valves 6 and for the outlet valves 7.

For admixing fuel to the fresh air, a direct fuel injection valve 10 is arranged in each cylinder head for injecting a fuel jet 11 directly into the combustion chamber 4. In the embodiment shown, additionally an intake duct injector 12 is provided which injects fuel optionally into the inlet passage 13. Via the fuel injection into the air intake passage, a homogeneous fuel/air mixture can be supplied to the combustion chamber 4. During high load engine operation fuel may be injected at the same time via both injectors for the admission of increased amounts of fuel. The direct fuel injection valve 10 and the inlet passage fuel injector 12 are supplied with fuel via fuel supply lines 15, 16 from a pump 18, to which fuel is supplied by way of a supply line 17 extending from a fuel tank 20. Particularly with the fuel pump 18 being in the form of a high pressure pump, it is expedient to provide a pre-supply pump 19 in the supply line 17 to the high pressure pump 18. The direct fuel injection valve 10 and the intake duct fuel injector 12 are each connected by control lines 23 and, respectively, 22 to the output side of a control unit 9, which controls the fuel appropriation depending on the engine operating conditions and sends corresponding valve actuating signals to the injection valves 10 and 12 via the control lines 23, 22. For the determination of the momentary engine operating conditions, information concerning engine load L, the engine speed n and other operating parameters is constantly supplied to the control unit 9.

In higher load operating ranges, the internal combustion engine is operated in the spark ignition mode wherein a stoichiometric fuel/air mixture is ignited by the spark of a spark plug 8 mounted in the cylinder head 5 and having electrodes projecting into the combustion chamber 4. The ignition timing is determined by the control unit 9, which is connected to the spark plug via a control line 30. During spark ignition operation, the fresh air mass flow is throttled by a throttle valve 24 arranged in the air inlet duct 13 to an amount corresponding to the engine operating state, wherein the adjustment angle of the throttle flap 24 is controlled by the control unit 9 via control line 25.

In the lower and intermediate load ranges of the internal combustion engine, a compression ignition operation is provided wherein the fresh air mass flow is supplied to the combustion chamber 4 essentially without throttling and a lean fuel mixture is caused to self-ignite in the combustion chamber. In this case, the fuel is injected into the combustion chamber by the direct injection valve 10 preferably in synchronism with the intake air flow before Z0T, the top dead center position of the piston. The self ignition of the fuel mixture is achieved by a temperature increase of the mixture in the combustion chamber by means of exhaust gas retention. The exhaust gas is retained in the cylinder by changing the valve opening times in comparison with those used during spark ignition operation so as to provide for an increased valve opening overlap. The gas exchange valve 6, 7 are in this case so adjusted that the temperature in the combustion chamber increases because of the hot exhaust gases retained and the mixture charge, compressed by the piston 3 and further heated thereby, auto-ignites.

In accordance with the invention, the engine inlet and outlet operating cam drive 26 is so designed that during spark ignition operation and during compression ignition operation different amplitudes and phase positions of the valve stroke of the gas exchange valves can be adjusted. A solution for changing the amplitude and phase position of the valve stroke which is simple by design and relatively inexpensive resides in a partially variable drive wherein the camshaft is provided for each valve with two cam contours 27 with different amplitudes of the valve stroke. As control element for the alternative cam contours 27, a switchable cup tappet or a switchable cam follower may be provided. The phase position of the opening stroke is adjusted by a camshaft phase adjuster on a camshaft 29 operating the respective gas exchange valves 6, 7. The switch-over of the valve control during a change-over of the engine operating modes between compression ignition and spark ignition is initiated by the control unit 9 via a control line 28. The control unit 9 comprises a performance graph store 21 from which the adjustment parameters corresponding to the momentary engine operating state for the control members controlled thereby can be derived as desired.

Figure 2:
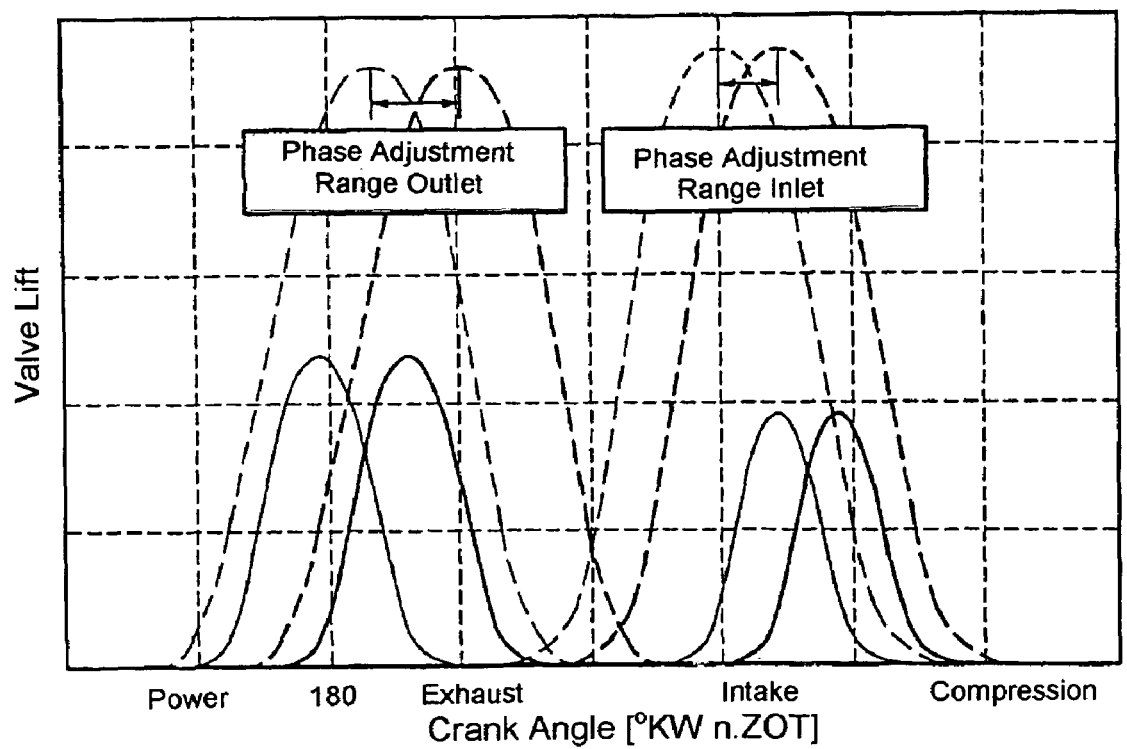
FIG. 2 show in a graph the amplitudes and the opening strokes of the gas exchange valves.

FIG. 2 is a graphic representative of the opening stroke of the inlet valve EV and the outlet valve AV for spark ignition operation of the engine and for compression ignition operation RZV. It is apparent therefrom that the phase position of the valve can be moved in the crankshaft angle range after the upper dead center of the piston stroke and furthermore also the valve stroke can be changed. The parameter for the phase adjustment and the valve lift which are adjustable by the camshaft drive during switch-over of the operating mode are coordinated with the parameters changed during the change-over of the operating mode and which affect the combustion process, namely the fuel injection parameters, and switching on and switching off of the spark ignition as will be explained in greater detail on the basis of FIGS. 3 and 4.

Figure 3:
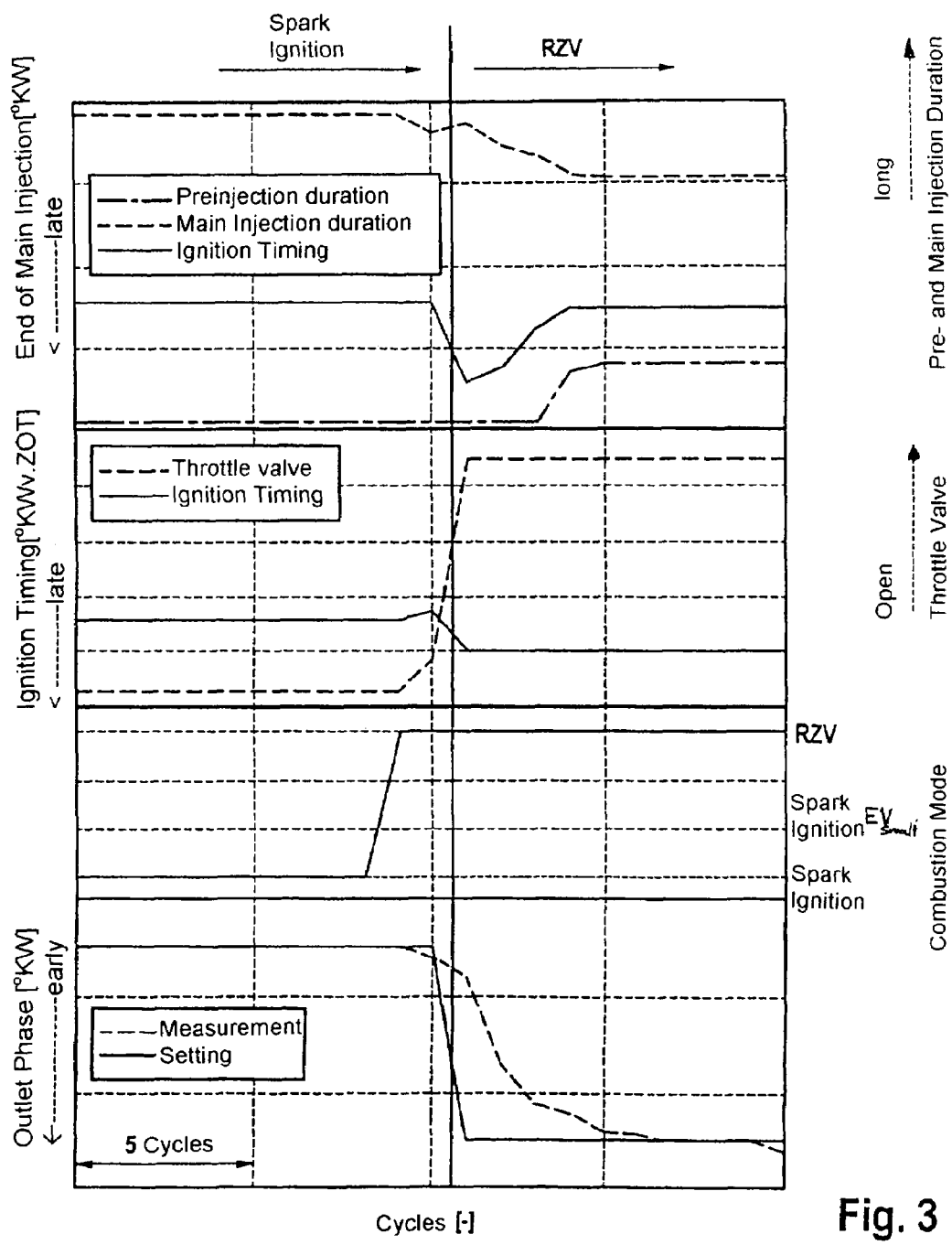
FIG. 3 shows in a graph the characteristic engine operating parameters during switch-over from a spark ignition engine operating mode to a compression ignition operating mode.

FIG. 3 is a graph showing the time-dependent injection parameter, the throttle valve and the adjustment of the cam valve drive during a switch-over of the combustion mode from spark ignition operation to compression ignition operation RZV. The main fuel injection duration is adapted during compression ignition operation according to the load requirements. With compression ignition operation, the combustion is more efficient than with spark-ignition so that during a load-neutral operating mode switchover, the fuel injection volume is reduced. The main injection duration is adapted accordingly. At the same time, the injection timing is retarded for compression ignition operation during the first operating cycle after the changeover of the operating mode, in order to reduce the combustion speed. A pre-injection of fuel is added only a few operating cycles after the switch-over. After switch over, the phase position of the opening stroke of the outlet valve is moved from late closing associated with the spark ignition operation to a stationary value as provided for compression ignition operation. Even if, because of a comparatively small adjustment speed of the switchable cam-operated valve drive, the adjustment according to the dashed line shown in the graph deviates from the measured adjustment, it has been found that the exhaust gas of the spark ignition operation is hot enough to provide for a temperature level sufficient for self-ignition in spite of the still relatively low exhaust gas retention rate.

The switch-over procedure from spark ignition operation to compression ignition operation is only negligibly affected by the transient behavior of the throttled spark-ignition operation. The very fast adjustability of the throttle valve flap and the rapid change of the air intake duct pressure during opening of the throttle valve facilitate a rapid switch-over. The changes of the injection parameters and of the cam valve drive and also of the throttle valve flap position occur within a period of only five cycles. With the movement of the main injection timing toward late and the change of the throttle valve flap position, a stable combustion during transition operation can be achieved during the five modified cycles and an early ignition or an excessively rapid combustion of the mixture in the compression ignition mode can be counteracted. In this way, a reasonable reaction of the combustion in the compression ignition mode to temperature changes of the intake air and of the retained exhaust gases can be achieved. The late main fuel injection and, if applicable, a post injection reduce the pressure increases during the changeover of the operation mode to the compression ignition mode whereby excessive cylinder pressures and knocking tendencies are eliminated.

During a change-over from spark ignition operation to the compression ignition operation with a reduction of the operating load, the operating load in the spark-ignition mode is first reduced to the newly desired load level and, subsequently a load-neutral switch-over procedure as described above is executed. The control unit 9 determines the number of the spark ignition cycles to occur before the change-over of the operating mode depending on the operating load in the previous spark-ignition operating mode and takes the temperature of the engine into consideration.

Figure 4:
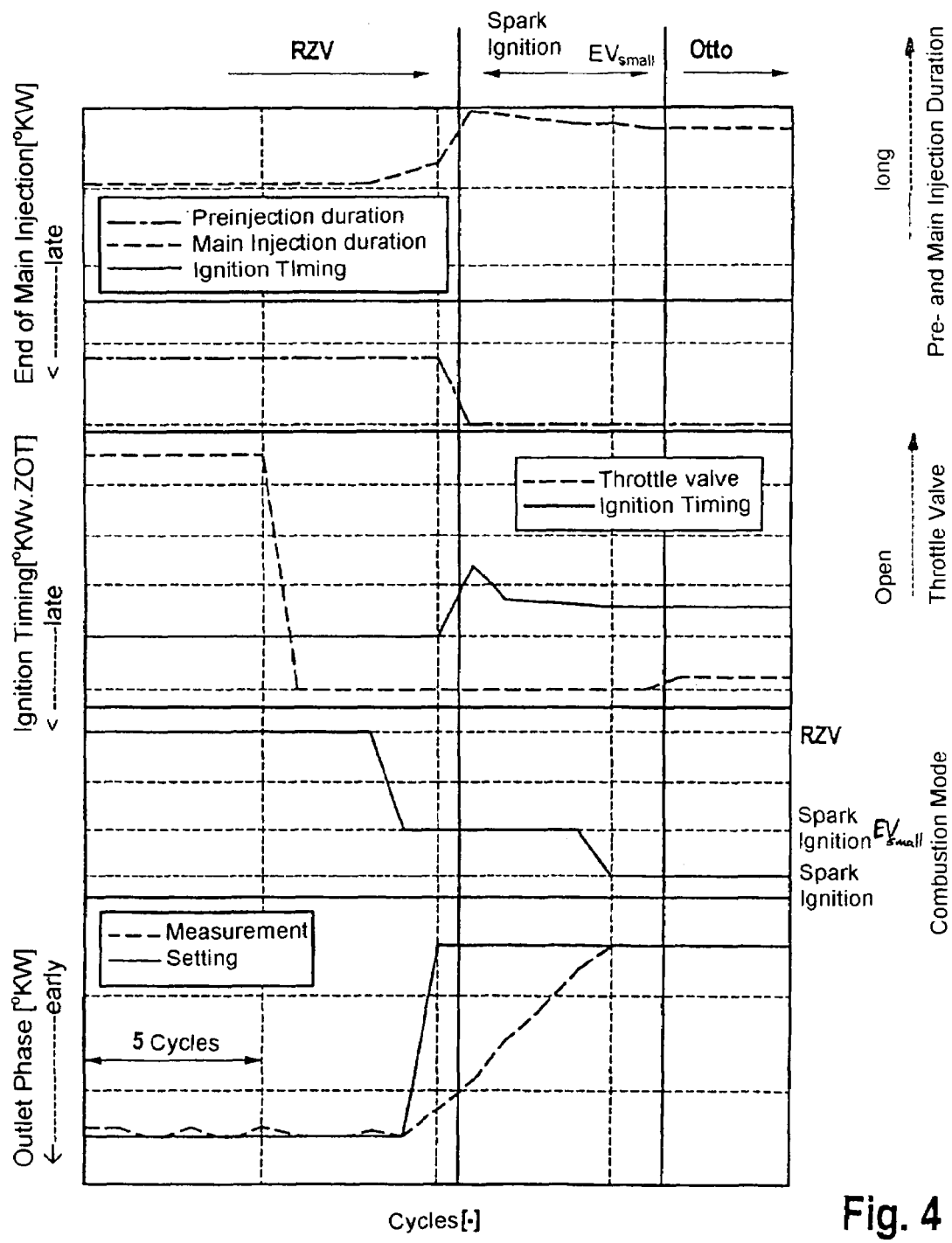
FIG. 4 shows in a graph the engine operating parameters during the switch-over from compression ignition operation to spark-ignition operation.

FIG. 4 shows graphically the parameter of the internal combustion engine, which is changed upon switch-over of the operating mode from compression ignition to spark-ignition. Herein, first, the throttle valve flap in the intake duct is closed whereby the pressure in the inlet duct is reduced and also the mixture in the combustion chamber is enriched. The throttle valve flap is closed a few cycles before the intended changeover of the operating mode, wherein the number of the cycles depends on the intake duct volume between the throttle valve and the inlet valves of the internal combustion engine as well as the number of the cylinders in communication therewith, that is, the design of the internal combustion engine. For the change-over of the operating mode, the amplitudes and the strokes of the gas exchange valves are adjusted to the values provided for spark ignition operation. Herein, during change-over to the spark ignition operating mode, a transition operation is provided with spark ignition at small valve opening amplitudes and a retarded phase position of the inlet valve stroke, whereby a lean spark ignition engine operation with high combustion stability is obtained. The closing of the throttle flap ahead of the transition operation with small opening stroke of the inlet valves assures that a throttled fresh air flow is present also in the spark ignition transition operation of the internal combustion engine.

During switch-over from the compression ignition operation to the spark ignition operation with a load increase, the duration of the switch-over procedure can be reduced, since, with an increased load, a larger volume flow of the fuel air mixture is needed and the number of the operating cycles with closed throttle valve flap can be reduced. The first few cycles with spark ignition combustion occur with a lean mixture and the spark ignition by means of the spark plug is advanced. During the switch-over of the operating mode, the fuel amount injected during the first few spark ignition cycles is reduced with respect to a stoichiometric spark ignition combustion because of the better efficiency of lean mixture operation.

What is claimed is:

1. A method of operating an internal combustion engine (1) comprising cylinders (2), each having a combustion chamber (4) and including a longitudinally movable piston (3), a cylinder head (5) delimiting the combustion chamber (4) and including a spark plug (8)), the cylinder head (5) having a fresh gas inlet passage (13) with an inlet valve (6) and an exhaust gas outlet passage (14) provided with an outlet valve (7) operated by a valve drive (26) for controlling the admission of fresh gas to, and the discharge of exhaust gas from, the combustion chamber (4), said method comprising the steps of:
    operating the internal combustion engine in high load ranges in a spark ignition mode wherein a stoichiometric air fuel mixture is provided in the combustion chamber (4) and ignited therein by the spark plug (8),
    operating the internal combustion engine (1) during lower load operation in a compression ignition mode, wherein a lean air/fuel mixture is provided in the combustion chamber (4),
    controlling the temperature in the combustion chamber by changing the inlet and outlet valve opening times such that a controllable amount of exhaust gases is retained in the combustion chamber so as to participate in the formation of the air/fuel mixture for increasing the temperature thereof by providing during a compression mode of operation an increased valve overlap in comparison with the spark ignition mode of operation and, for a change between a spark ignition mode of operation and a compression mode of operation, changing the injection parameters, the throttling of the fresh gas flow and the valve control in a coordinated manner, wherein the valve control is switched over by changing the amplitude and the phase position of the valve lift of at least one of the gas exchange valves (6, 7) and, depending on the desired operating load of the engine (1), with a changeover to the compression ignition mode of operation, the injection duration of a main fuel injection is reduced and, in a first operating cycle of the cylinder with compression ignition, the injection timing is retarded.

2. A method as defined in claim 1, wherein the valve lift amplitude is changed by a switch-over between two alternatively usable cam contours (27) of the valve drive (26).

3. A method as defined in claim 2, wherein as switchover element a switchable cup tappet is used.

4. A method as defined in claim 2, wherein as switch-over element a switch-over cam follower is used.

5. A method as defined in claim 1, wherein the phase position of the valve opening stroke is adjusted by a phase adjuster disposed on a camshaft (29) for changing the phase position of a particular gas exchange valve (6, 7).

6. A method as defined in claim 1, wherein, during the change-over to compression ignition operation, fuel pre-injection is suspended and is reinstated several cycles after the change-over of the operating mode.

7. A method as defined in claim 1, wherein, after the switch-over of the injection parameter, the valve drive (26) of the outlet valve (7) is adjusted.

8. A method as defined in claim 1, wherein, with a change-over of the engine operating mode to spark ignition, the fresh air inlet flow is throttled for several operating cycles ahead of the switch-over procedures.

9. A method as defined in claim 8, wherein the timing of the begin of the throttling procedure ahead of the change-over of the operating mode is determined depending on the difference between the desired operating load and the previous operating load.

10. A method as defined in claim 8, wherein a throttling member (24) arranged in the inlet passage (13) is closed and then moved to a position corresponding to the desired operating load of the internal combustion engine.

11. A method as defined in claim 1, wherein, with a change-over of the operating mode to spark-ignition operation, the valve opening stroke is increased.

12. A method as defined in claim 10, wherein, upon change-over of the operating mode to the spark ignition mode of operation, first a spark ignition transition operation with a small valve stroke and late opening of the inlet valve is provided for and the valve drive (25) for the inlet valve (6) is adjusted to the setting as provided during spark ignition operation as a final measure of the operating mode switch-over.

* * * * *